(12) United States Patent
Craig et al.

(10) Patent No.: US 12,004,680 B2
(45) Date of Patent: Jun. 11, 2024

(54) SERVER SYSTEM WITH COMMUNICATION

(71) Applicant: BUNN-O-MATIC CORPORATION, Springfield, IL (US)

(72) Inventors: Josh Craig, Springfield, IL (US); Prashanth Sankaran, Springfield, IL (US)

(73) Assignee: BUNN-O-MATIC CORPORATION, Springfield, IL (US)

( * ) Notice: Subject to any disclaimer, the term of this patent is extended or adjusted under 35 U.S.C. 154(b) by 716 days.

(21) Appl. No.: 17/048,033

(22) PCT Filed: Apr. 18, 2019

(86) PCT No.: PCT/US2019/028057
§ 371 (c)(1),
(2) Date: Oct. 15, 2020

(87) PCT Pub. No.: WO2019/204567
PCT Pub. Date: Oct. 24, 2019

(65) Prior Publication Data
US 2021/0106169 A1    Apr. 15, 2021

Related U.S. Application Data

(60) Provisional application No. 62/660,821, filed on Apr. 20, 2018.

(51) Int. Cl.
*A47J 31/52* (2006.01)
*A47J 31/10* (2006.01)
*A47J 31/46* (2006.01)
*A47J 31/50* (2006.01)

(52) U.S. Cl.
CPC .............. *A47J 31/521* (2018.08); *A47J 31/10* (2013.01); *A47J 31/46* (2013.01); *A47J 31/50* (2013.01); *A47J 31/525* (2018.08)

(58) Field of Classification Search
CPC ........ A47J 31/007; A47J 31/50; A47J 31/505; A47J 31/521; A47J 31/525
See application file for complete search history.

(56) References Cited

U.S. PATENT DOCUMENTS 5,644,972 A * 7/1997 Dahmen ................ A47J 31/007
                                                                99/290
6,759,072 B1 * 7/2004 Gutwein .............. G06Q 20/342
                                                                426/429

(Continued)

FOREIGN PATENT DOCUMENTS

WO    WO 8807830 A1 * 10/1988 ............ A47J 31/007

OTHER PUBLICATIONS

Search Report & Written Opinion issued in Intl Appl. No. PCT/US2019/028057 (dated 2019).

*Primary Examiner* — Reginald Alexander
(74) *Attorney, Agent, or Firm* — Barnes & Thornburg LLP

(57) ABSTRACT

A beverage brewing system with a beverage server and a brewer. The beverage server includes an information device to store a beverage recipe. The brewer includes a communication device to wirelessly read the recipe from the beverage server. During the brewing process, the brewer reads the recipe from the beverage server and sends control signals to create a brewed beverage according to the beverage recipe.

18 Claims, 2 Drawing Sheets

(56) References Cited

U.S. PATENT DOCUMENTS

| | | | |
|---|---|---|---|
| 7,268,698 B2* | 9/2007 | Hart | A47J 31/60 |
| | | | 99/275 |
| 2003/0129286 A1* | 7/2003 | Knepler | A47J 31/525 |
| | | | 426/231 |
| 2007/0296608 A1 | 12/2007 | Hart et al. | |
| 2015/0135966 A1 | 5/2015 | Hulett et al. | |
| 2015/0201796 A1* | 7/2015 | Kuempel | A47J 31/52 |
| | | | 99/283 |
| 2016/0027132 A1 | 1/2016 | Craparo et al. | |

* cited by examiner

SERVER SYSTEM WITH COMMUNICATION

RELATED APPLICATIONS

This application is a U.S. nationalization under 35 USC § 371 of International Application No. PCT/US2019/028057, filed 18 Apr. 2019, which claims the benefit of U.S. Provisional Application Ser. No. 62/660,821 filed Apr. 20, 2018, for a "Server System with Communication." The disclosures set forth in the referenced applications are incorporated herein by reference in their entireties.

BACKGROUND

A variety of beverage production systems exist. One form of beverage production system, referred to as a brewer assembly, dispenses water into a brewing substance, such as coffee, tea or other substances, to create a brewed beverage. The brewer typically dispenses the brewed beverage into a beverage server or other beverage dispenser.

Some brewers can be programmed. For example, a user can select certain brewing parameters, recipes or characteristics to be applied during the brewing process. One of the problems with programmable brewers, however, is that the parameters selected on the brewer may not match the beverage server into which the brewed beverage is being dispensed. For example, the volume selected on the brewer may not match the beverage server size. Another potential problem is that the flavor profile selected by the user may not match what has previously been brewed with the beverage server. For example, with flavored coffees and teas, the beverage server may retain residual flavor that is not appropriate for the recipe selected by the user. As such, it would be desirable to prevent cross contamination of flavor from server to server.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

In some embodiments, the present invention includes a brewing system having at least one beverage brewer and at least one beverage server. The system will help aid in or reduce error when selecting a recipe to brew at a specific server. This system helps simplify the brewing process by allowing the server to dictate the recipe selection based on what was previously brewed into it. Before, during or after a brew cycle the recipe information can be written to the server. Once the server has been placed back on the brewer, the active recipe at the brewer will automatically be changed to the previously brewed recipe for that specific server. The user will still have the ability to change the recipe name (recipe components, steps, etc.) manually while also having the ability to select a batch size. For example, this updated recipe information could be stored in a recipe library on the brewer.

In certain embodiments, the present invention helps reduce user error by preventing the incorrect selection of a recipe for a specific server. In other words, since a recipe will travel with the server, the user cannot make an error when replacing the server at a brewer for brewing coffee into the server.

In some embodiments, the present invention simplifies the operation of the overall brewing system by retaining the recipe with the server so that when the server is placed at a brewer, the brewer can display the recipe and allow the user to accept the recipe while activating the start of the brew cycle at the brewer.

Further, in certain embodiments, the present invention allows the servers to be identified by recipe name and/or information to help the user understand what the server has been used for.

DETAILED DESCRIPTION

Figure 1:
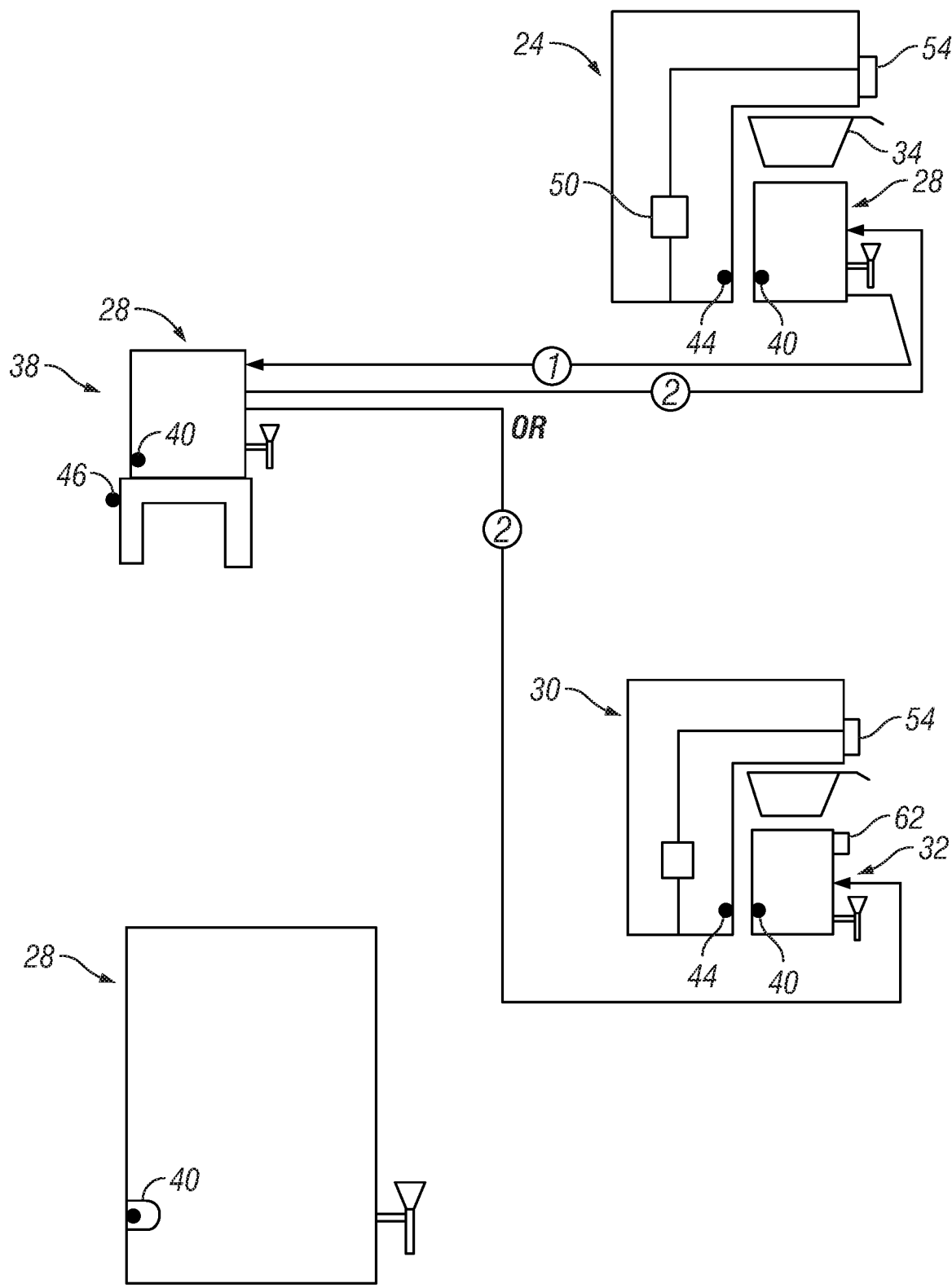
FIG. 1 is a schematic view of the invention which shows a server being placed at a brewer and illustrated movement of the server to another location with subsequent return of the server to either the same brewer or, alternatively a different brewer.

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a brewing substance with a liquid such as water without limitation to the temperature of such liquid unless specified. This broad interpretation is also intended to include, but is not limited to, brewing substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product. Beverage brewing substances will be described in the present application and generally will be referred to as "coffee". However, it should be understood that the term brewing substance should be broadly interpreted regardless of reference to brewing substance or coffee.

The foregoing terms as well as other terms should be broadly interpreted throughout this application to include all known as well as all hereafter discovered versions, equivalents, variations, and other forms of the abovementioned terms as well as other terms. The present disclosure is intended to be broadly interpreted and not limited.

With reference to FIG. 1, a system 20 is illustrated including at least one brewer 24 and at least one corresponding server 28. As shown, multiple brewers 24, 30 are illustrated as well as multiple servers 28, 32. The brewer includes a funnel assembly 34 for retaining a volume of beverage brewing substance, such as coffee, during the brewing process. The brewer 24 operates in a generally known manner to dispense heated water into the funnel assembly 34 to create a brewed beverage. The brewer is programmable and, in some embodiments, includes a storage device for storing a recipe library with a plurality of recipes with parameters, characteristics, features or other information that controls how a beverage is brewed. The brewer has an interface 54, which could include a display, buttons, etc., from which the user can select a recipe from the recipe library to be brewed. The brewed beverage is then dispensed into the server 28, according to the selected recipe, there below for retaining the brewed beverage and dispensing either at the brewer 24 or at a remote location 38. The remote location 38 may be in the form of a stand or heated system whereby energy is controllably provided to the server to maintain the temperature of the coffee in the server within a predetermined temperature range.

As shown in the enlarged view of the representation of the server 28, the server 28 includes an information device 40. The information device 40 can be coupled to the brewer 24 that includes the reader 44. In an alternate embodiment, the remote location 38 can also include a reader 46.

The server 28 includes the information device 40 and the brewer 24 includes the reader 44 that reads the information device 40. The reader 44 communicates the information from the information device 40 to a controller 50 for use to individually or collectively display information, collect information, and/or selectively affect the condition of the server 28 and the brewer 24 that is used to produce beverage for the server 28. In its general embodiment, the brewer 24 includes the read/write device 44 to read information on the server 28 and, as needed, write information to the server 28. The funnel 34 used in this system 20 also may include information devices 52 which can be used to carry information related to the recipe associated with the beverage to be dispensed. When the funnel 50 is attached to the brewer 24, the brewer 24 reads the information on the funnel 34. The information can be in the form of a recipe that generally includes but is not limited to the type of bean used, brewing parameters for that bean, and the volume of beverage to be brewed. The recipe read by the brewer from the funnel 34 or server 28 may be similar to how recipes in the recipe library on the brewer is used to control the brewing process. This information regarding one or more parameters of the recipe can be displayed on a user interface 54 on the brewer 24 at the start of the brewing process. The interface 54 can prompt the user to confirm that this is accurate.

It would be desirable to provide the information device 40 and a corresponding read/write information communication device 44 to sense or otherwise detect the presence, absence or both of a server approximate to the information communication device. The information device 40 will be referred to as the "information device" herein with the understanding that it is to be broadly interpreted and not limited. The corresponding read/write information communication device 44 will be referred to as the "reader" herein with the understanding that it is broadly to be interpreted and not limited.

While the reader 44 is shown as being in a position on the server 28, such as the rear portion of the server 28, the reader 44 may be placed otherwise on any of the corresponding brewers 24 or stations to read the information device 40. Generally, it is envisioned that the information device 40 and reader 44 may require some degree of relative proximity to provide a signal. This is due to the current limitations relating to such information devices such as an RFID. However, it is envisioned and fully within the scope of the present disclosure that other types of information device 40 and associated readers 44 may be employed or developed which do not require relative proximity of the server 40 to the reader 44 and which might not be an RFID device.

It is envisioned that such systems and devices and all existing and hereafter developed systems and devices are fully within the scope of the present disclosure and encompassed by the present disclosure. As an example, the information device 40 could be another type of component that receives a wireless signal either related to or unrelated to the brewer 24 or remote station 38. In this regard, the brewer 24 or remote station 38 could also include a wireless communication device such that the individual devices communicate via wireless to one or more controllers which than act to account for the presence of the brewer, remote station, or server. As such, even though one embodiment would have the controller 50 resident on a brewer, the controller could also be remote from all of the relevant devices for the communication and control thereof.

The information device 40 can be used to receive and retain information such as at least one recipe component. The ability to receive and retain recipe components on the server 28 can be useful in a situation where the server 28 is removed from a first brewing apparatus 24 and placed at either a second brewing apparatus 30 or a remote warming station 38. Additionally, once the server 28 is moved to one of the other brewers and placed at either a second brewer or a remote warming station it may be moved between such brewers and/or stations and not returned to the original brewer.

In one embodiment, a brewer 24 brews into a server 28 and the reader 44 communicates or writes a name or recipe and volume on the server information device 40. The server can then be moved to a different location such as a remote station or a non-station or non-brewer location such as for dispensing regardless of a station or a brewer location. Coffee is then dispensed from the server until it needs either to be replenished or disposed of. The server is then returned to a brewer after being drained through dispensing or drained to dispose of leftover or unnecessary coffee. At the brewer, the system reads the information on the information device and displays the information on a user interface. The user interface can be on the brewer or held by the operator who is placing the server at the brewer. In this regard, the hand held device could be a tablet, pad, phone, or similar device that displays the information for the control of the brewer. Such a separate device would require an interface with the brewer to provide control signals to the brewer. The brewer user interface or other interfaces can than display the name/recipe and the volume. The name/recipe can relate to the type of beans, or some other more arbitrary name. Regardless of the name, it will communicate to the user via the user interface about the coffee to be brewed. Additionally, the volume can be displayed so the user knows that the correctly sized server is positioned for this recipe. In some embodiments, the recipe read from the server 28 could be stored in the recipe library on the brewer 24.

The display can give the user the option to accept the recipe and volume or to abort this selection. This gives the user a momentary step in order to make the decision and possibly avoid an error.

The system can be programmed to acknowledge the dedicated volume associated with the server which, is included as part of the recipe. However, if the user tries to manually alter the recipe, perhaps by changing the volume, the system could override this action or create a flag to prevent dispensing an inappropriate volume of coffee into the server, which could otherwise result in overflowing the server.

The server, once returned to any brewer will automatically communicate information to the brewer that is capable of receiving the information and default to the recipe on the server as the recipe to be used with the brewer.

In addition, when a server is positioned at a brewer the default is to report the recipe retained on the server. The user can then select the "start" brew button to initiate the brewing cycle. Of course, a funnel retaining beverage brewing substance must also be appropriately positioned on the brewer before the actual brewing can initiate. However, if all the components are in place the use of the server including information retained on the server helps to simplify the brewing process.

The brewer can also confirm the information associated with the server information device. This will confirm that the server is the appropriate size as well as the recipe associated with the beverage dispensed into that server. This prevents cross contamination of flavor. As an example, if a flavored coffee such as hazel nut was dispensed into the server residual hazelnut flavor can remain in the server. The flavor can remain in the server either as some measurable volume in the server after substantial dispensing or as a residual flavor even if the server is effectively empty. It could be undesirable to dispense unflavored coffee into such a server since there is a possibility that the hazelnut flavor would be detected. Coffee consumers can be rather particular about the flavors of their coffees. As such, it would be desirable to prevent cross contamination of flavor from server to server.

If the brewer detects a mismatch between the funnel information/recipe and the server information/recipe the funnel recipe can be identified as taking precedence over the server recipe. This can be programed to allow the user to accept the mismatch and proceed with the funnel recipe or alternatively to select the server recipe. Another embodiment might not give the user that choice but merely proceed with the funnel recipe.

In at least one embodiment, the brewer does not let the user modify the recipe or this information but merely accept or decline the information to start the brewing process. In other embodiments, the brewer can be configured to allow a user to modify the information manually at the display or through another device.

If the recipe in the server 28 is not in the recipe library stored on the brewer 24, an attempt will be made to add that recipe name to the brewer's 24 recipe library. A pop up will display on the interface to show the user the recipe that was added. If the library is full, a pop up display will appear notifying the user of the capacity issue. The brewer funnel event will pop up for library full and recipe added can be reused with the server, with any reference to funnel replaced with server.

If the feature is enabled along with the brewing funnel, the funnel will take precedence if there is a mismatch between the server recipe and the funnel recipe. A pop up will be displayed notifying of the mismatch in the recipes. The pop up will show that the recipes do not match and show the name of the recipe for the funnel and the server. It will allow the user to verify that the funnel recipe should be used.

Alternatively, the system can be configured to include a choice between "current recipe" and "select other recipe." If the "select other recipe" is chosen by the user, the user must then review the available options. The user should be aware of the contents of the brewing funnel to choose an option that is consistent with the ground coffee ingredient retained in the funnel. In this regard, the recipe could include such characteristics as "type of bean, volume to be brewed (batch size), ground setting, water temperature, by-pass volume, drip-out time, and other brewing water functions such as rate of pulse, volume of pre-wet, volume of initial pre-infusion, and operation of spray head wave features."

The system can operate with only a server including the information device or a server with an information device along with a funnel that also includes an information device. This can be useful so that the information device contained on the funnel can be used to control a fresh coffee bean grinder to grind the particular type and volume of the freshly ground coffee to be dispensed into the funnel. The funnel can then be transferred to the brewer to provide a recipe to the brewer. If the server also positioned at the brewer with the funnel has a recipe that is different from the recipe carried on the funnel, then the conflict needs to be resolved. In one embodiment, the conflict between the funnel recipe and the server recipe is resolved by defaulting to the funnel. One reason for defaulting to the funnel recipe might be that the funnel has already directed the grinder to provide a particular type of bean and grind setting for dispensing into the funnel for use in the brewing process. When such a conflict is displayed to the user and the user accepts the default option of the recipe on the funnel, the system can update the information device on the server to the recipe that was presented by the funnel. This helps to essentially recalibrate the server to be consistent with the funnel. This also gives the user the opportunity to consider whether the server needs to be cleaned in a manner that might remove any residual flavor or other characteristics that might be inconsistent with the new brew that we dispensed into the server.

The present invention also provides an option to use a display 62 carried on the server 32 to display information about the contents of the server. While the brewer 30 is described herein as having a user interface 54, the server 32 could also include a user interface 62. The interface 54 might be controllable or might be relatively passive. In this regard, if a controllable device is used, a user could control the display on the server. Alternatively, if a relatively passive display is used in such a passive display system, the display will merely repeat the information associated with the name/recipe of the server. This might be characterized by a particular coined name or the name of the type, roast, or other characteristic of the bean used to produce the coffee.

It should be noted that the discussion herein has been in relation to "coffee". Other types of beverage brewing substances may be used and other ingredients might be used instead of water that is technically used to brew a beverage. In this regard, coffee, tea, tisane, herbal teas, or other ingredients could be used to produce a brewed beverage. All of these ingredients, as well as any that are hereafter developed for use in such an apparatus are considered included within the scope of the present application.

Additionally, while water is typically used in the brewing process, other ingredients that might be used and combined with a brewing or infusing substance should be considered within the scope of the present disclosure.

As noted hereinabove, the information device could be in the form of an RFID device or other types of devices. The information device can be used to retain information or otherwise identify the type of bean (regular/decaf/flavor, etc.) as well as recipe characteristics. An information device used to identify tea could also include whether the tea is sweetened, unsweetened, flavored, etc.

The reading device can be a sensing coil that is coupled to a controller or other device as appropriate for reading the information device. The information device can be pre-loaded with read only information or the read/write capable. In the case of a read only device, the reader will use the information on the device to read information to the brewer. This allows the recipe information to be transferred to the brewer of the use. In an embodiment using a read/write device, the information device can be updated by the writing function.

Figure 2:
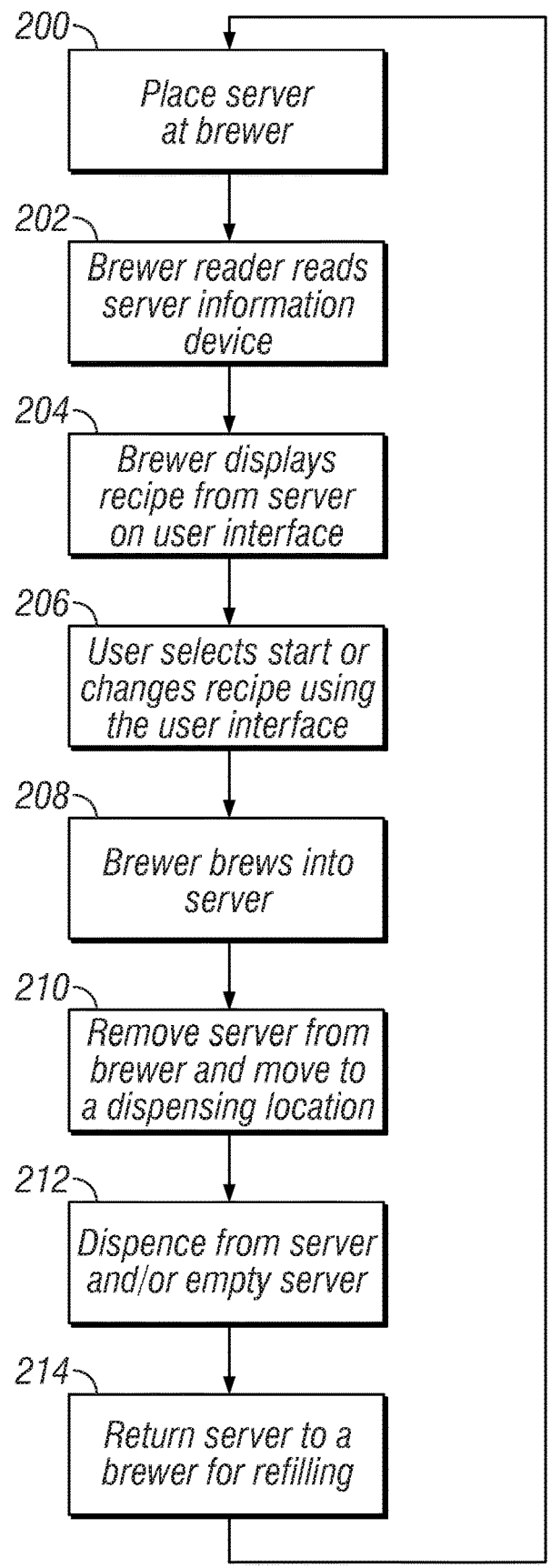
FIG. 2 is a schematic identifying various steps associated with the operation of the disclosed system, in part, identifying various steps, stages or displays which might be presented to a user.

FIG. 2 illustrates example steps that could occur during operation of the beverage brewing system according to an embodiment. In this example, the user initially places the server 28 at the brewer 24 (block 200). When the server 28 is detected to be within a reference distance of the brewer 24, such as with a proximity sensor, the brewer 24 reads data from the server information device 40 (block 202). As discussed herein, the data stored on the server information device 40 could include a beverage recipe, which may include bean type, brewed volume, ground setting, water temperature, by-pass volume, drip-out time, pulse rate, pre-wet volume, initial pre-infusion volume, and/or spray head operation.

After reading data from the server information device 40, the brewer 24 may display one or more parameters of the beverage recipe on the user interface 54 (block 204). Depending on the user's selection, the user could interact with the interface 54 to start the brewing process or make modifications to the recipe before starting (block 206). During the brewing process, the brewer 24 dispenses a brewed beverage into the server 28 (block 208). The user may then remove the server 28 from the brewer 24 and move the server 28 to a dispensing location (block 210), which could be a remote location from the brewer 24 depending on the circumstances. The brewed beverage will then be dispensed from the server 28, and after a period of time, if there is unused beverage in the server, the server 28 will be emptied (block 212). The server 28 can then be returned to the server to be refilled with a brewed beverage (block 214).

While the reader 44 is shown as being in a position on the server 28, such as the rear portion of the server 28, the reader 44 may be placed otherwise on any of the corresponding brewers 24 or stations to read the information device 40

EXAMPLES

Illustrative examples of the technologies disclosed herein are provided below. An embodiment of the technologies may include any one or more, and any combination of, the examples described below.

Example 1 includes a beverage brewing system with a beverage server and a beverage brewer. The beverage server is to hold a brewed beverage and includes an information device to store brewed beverage data comprising a beverage recipe. The beverage brewer includes a brewing assembly to create a brewed beverage, a communication device to wirelessly read the brewed beverage data from the information device of the beverage server, one or more processors, and one or more data storage devices having stored therein a plurality of instructions that, when executed by the one or more processors, cause the beverage brewer to perform certain operations. During operation, the beverage brewer reads, using the communication device, the brewed beverage data from the information device of the beverage server and sends control signals to the brewing assembly to create the brewed beverage according to the beverage recipe.

Example 2 includes the subject matter of Example 1, further comprising instructions to provide at least a portion of the beverage data to a user interface in response to reading the brewed beverage data.

Example 3 includes the subject matter of Examples 1-2, wherein the user interface is formed, at least in part, on one or more of the beverage server or a mobile device.

Example 4 includes the subject matter of Examples 1-3, further comprising instructions to: prompt for confirmation to brew according to the beverage recipe on the user interface; and in response to receiving confirmation via the user interface, send control signals to the brewing assembly to create the brewed beverage according to the beverage recipe.

Example 5 includes the subject matter of Examples 1-4, further comprising instructions to: modify the beverage recipe based on input received from the user interface to create a modified beverage recipe; and send control signals to the brewing assembly to create a brewed beverage according to the modified beverage recipe.

Example 6 includes the subject matter of Examples 1-5, wherein to modify the beverage recipe comprises to modify one or more of bean type, brewed volume, ground setting, water temperature, by-pass volume, drip-out time, pulse rate, pre-wet volume, initial pre-infusion volume, or spray head operation based on input received from the user interface.

Example 7 includes the subject matter of Examples 1-6, further comprising instructions to store the modified beverage recipe on the information device of the beverage server using the communication device.

Example 8 includes the subject matter of Examples 1-7, further comprising instructions to determine whether the modified beverage recipe is invalid, and in response to a determination that the modified beverage recipe is invalid, to: prevent creation of the brewed beverage; and/or create a message on the user interface indicating the modified beverage recipe is invalid.

Example 9 includes the subject matter of Examples 1-8, wherein the determination that the modified beverage recipe is invalid comprises to: determine whether a beverage volume in the modified beverage recipe conforms to a maximum volume of the beverage server; and/or determine whether a beverage flavor in the modified beverage recipe would result in flavor cross-contamination with the beverage server.

Example 10 includes the subject matter of Examples 1-9, further comprising a funnel assembly connectable with the brewing assembly to create a brewed beverage and dispense the brewed beverage into the beverage server, wherein the funnel assembly includes an information device to store brewed beverage data comprising a beverage recipe.

Example 11 includes the subject matter of Examples 1-10, further comprising instructions to detect a conflict between the beverage recipe of the funnel assembly and the beverage recipe of the beverage server.

Example 12 includes the subject matter of Examples 1-11, further comprising instructions to determine, in response to detection of the conflict, whether to create the brewed beverage based on the beverage recipe of the funnel assembly or the beverage recipe of the beverage server.

Example 13 includes the subject matter of Examples 1-12, wherein to determine which of the beverage recipes to create the brewed beverage comprises to determine a default preference between the funnel assembly and the beverage server.

Example 14 includes the subject matter of Examples 1-13, wherein to determine which of the beverage recipes to create the brewed beverage comprises to prompt for selection from the user interface.

Example 15 includes the subject matter of Examples 1-14, further comprising a display on the beverage server to present at least a portion of the user interface.

Example 16 includes the subject matter of Examples 1-15, wherein the beverage brewer includes a proximity sensor to detect the beverage server being within a reference range of the beverage brewer.

Example 17 includes the subject matter of Examples 1-16, further comprising instructions to read, using the communication device, the brewed beverage data from the information device of the beverage server in response to the proximity sensor detecting that the beverage server is within the reference range of the beverage brewer.

Example 18 includes the subject matter of Examples 1-17, wherein the beverage recipe comprises one or more of a bean type bean, brewing parameters for the bean type, or a beverage volume to be brewed.

Example 19 includes a beverage brewing system with a beverage server and a beverage brewer. The beverage server is to hold a brewed beverage and includes an information device to store brewed beverage data comprising a beverage recipe. The beverage brewer includes a brewing assembly to create a brewed beverage, a proximity sensor to detect when the beverage server is within a reference range of the beverage brewer, a user interface including a display, a communication device to wirelessly read the brewed beverage data from the information device of the beverage server, one or more processors, and one or more data storage devices having stored therein a plurality of instructions that, when executed by the one or more processors, cause the beverage brewer to perform certain operation. In operation, the beverage brewer reads, using the communication device, the brewed beverage data from the information device of the beverage server in response to the proximity sensor detecting that the beverage server is within the reference range of the beverage brewer. The beverage brewer presents at least a portion of the beverage recipe on the display and prompts for a confirmation input on the user interface to create a brewed beverage according to the beverage recipe. In response to receiving the confirmation input, the beverage brewer sends control signals to the brewing assembly to create the brewed beverage according to the beverage recipe.

Example 20 includes the subject matter of Example 19, further comprising instructions to: modify the beverage recipe based on input received from the user interface to create a modified beverage recipe; and send control signals to the brewing assembly to create a brewed beverage according to the modified beverage recipe.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

What is claimed is:

1. A beverage brewing system comprising:
   a beverage server to hold a brewed beverage, wherein the beverage server includes an information device to store brewed beverage data comprising a beverage recipe;
   a beverage brewer comprising:
      a brewing assembly to create a brewed beverage;
      a communication device to wirelessly read the brewed beverage data from the information device of the beverage server;
      one or more processors;
      one or more data storage devices having stored therein a plurality of instructions that, when executed by the one or more processors, cause the beverage brewer to:
         read, using the communication device, the brewed beverage data from the information device of the beverage server;
         provide at least a portion of the beverage data to a user interface in response to reading the brewed beverage data, wherein the user interface is formed, at least in part, on one or more of the beverage server or a mobile device; and
         send control signals to the brewing assembly to create the brewed beverage according to the beverage recipe.

2. The beverage brewing system of claim 1, further comprising instructions to: prompt for confirmation to brew according to the beverage recipe on the user interface; and in response to receiving confirmation via the user interface, send control signals to the brewing assembly to create the brewed beverage according to the beverage recipe.

3. The beverage brewing system of claim 1, further comprising instructions to: modify the beverage recipe based on input received from the user interface to create a modified beverage recipe; and send control signals to the brewing assembly to create a brewed beverage according to the modified beverage recipe.

4. The beverage brewing system of claim 3, wherein to modify the beverage recipe comprises to modify one or more of bean type, brewed volume, ground setting, water temperature, by-pass volume, drip-out time, pulse rate, pre-wet volume, initial pre-infusion volume, or spray head operation based on input received from the user interface.

5. The beverage brewing system of claim 3, further comprising instructions to store the modified beverage recipe on the information device of the beverage server using the communication device.

6. The beverage brewing system of claim 3, further comprising instructions to determine whether the modified beverage recipe is invalid, and in response to a determination that the modified beverage recipe is invalid, to: prevent creation of the brewed beverage; and/or create a message on the user interface indicating the modified beverage recipe is invalid.

7. The beverage brewing system of claim 6, wherein the determination that the modified beverage recipe is invalid comprises to: determine whether a beverage volume in the modified beverage recipe conforms to a maximum volume of the beverage server; and/or determine whether a beverage flavor in the modified beverage recipe would result in flavor cross-contamination with the beverage server.

8. The beverage brewing system of claim 1, further comprising a funnel assembly connectable with the brewing assembly to create a brewed beverage and dispense the brewed beverage into the beverage server, wherein the funnel assembly includes an information device to store brewed beverage data comprising a beverage recipe.

9. The beverage brewing system of claim 8, further comprising instructions to detect a conflict between the beverage recipe of the funnel assembly and the beverage recipe of the beverage server.

10. The beverage brewing system of claim 9, further comprising instructions to determine, in response to detection of the conflict, whether to create the brewed beverage based on the beverage recipe of the funnel assembly or the beverage recipe of the beverage server.

11. The beverage brewing system of claim 10, wherein to determine which of the beverage recipes to create the brewed beverage comprises to determine a default preference between the funnel assembly and the beverage server.

12. The beverage brewing system of claim 11, wherein to determine which of the beverage recipes to create the brewed beverage comprises to prompt for selection from the user interface.

13. The beverage brewing system of claim 1, further comprising a display on the beverage server to present at least a portion of the user interface.

14. The beverage brewing system of claim 1, wherein the beverage recipe comprises one or more of a bean type bean, brewing parameters for the bean type, or a beverage volume to be brewed.

15. A beverage brewing system comprising:
a beverage server to hold a brewed beverage, wherein the beverage server includes an information device to store brewed beverage data comprising a beverage recipe;
a beverage brewer comprising:
a proximity sensor to detect the beverage server being within a reference range of the beverage brewer;
a brewing assembly to create a brewed beverage;
a communication device to wirelessly read the brewed beverage data from the information device of the beverage server;
one or more processors;
one or more data storage devices having stored therein a plurality of instructions that, when executed by the one or more processors, cause the beverage brewer to:
read, using the communication device, the brewed beverage data from the information device of the beverage server; and
send control signals to the brewing assembly to create the brewed beverage according to the beverage recipe.

16. The beverage brewing system of claim 15, further comprising instructions to read, using the communication device, the brewed beverage data from the information device of the beverage server in response to the proximity sensor detecting that the beverage server is within the reference range of the beverage brewer.

17. A beverage brewing system comprising:
a beverage server to hold a brewed beverage, wherein the beverage server includes an information device to store brewed beverage data comprising a beverage recipe;
a beverage brewer comprising:
a brewing assembly to create a brewed beverage;
a proximity sensor to detect when the beverage server is within a reference range of the beverage brewer;
a user interface including a display;
a communication device to wirelessly read the brewed beverage data from the information device of the beverage server;
one or more processors;
one or more data storage devices having stored therein a plurality of instructions that, when executed by the one or more processors, cause the beverage brewer to:
read, using the communication device, the brewed beverage data from the information device of the beverage server in response to the proximity sensor detecting that the beverage server is within the reference range of the beverage brewer;
present at least a portion of the beverage recipe on the display;
prompt for a confirmation input on the user interface to create a brewed beverage according to the beverage recipe; and
in response to receiving the confirmation input, send control signals to the brewing assembly to create the brewed beverage according to the beverage recipe.

18. The beverage brewing system of claim 17, further comprising instructions to: modify the beverage recipe based on input received from the user interface to create a modified beverage recipe; and send control signals to the brewing assembly to create a brewed beverage according to the modified beverage recipe.

\* \* \* \* \*